US006267932B1

(12) United States Patent
Nilsson

(10) Patent No.: US 6,267,932 B1
(45) Date of Patent: Jul. 31, 2001

(54) CATALYTIC REACTORS

(75) Inventor: Sven Nilsson, Kållered (SE)

(73) Assignee: Kemira Metalkat Oy, Vihtavuori (FI)

( * ) Notice: Subject to any disclaimer, the term of this patent is extended or adjusted under 35 U.S.C. 154(b) by 0 days.

(21) Appl. No.: 09/400,487

(22) Filed: Sep. 21, 1999

Related U.S. Application Data

(63) Continuation-in-part of application No. PCT/SE97/00480, filed on Mar. 21, 1997.

(51) Int. Cl.[7] ............................... B01D 50/00; B01J 35/04
(52) U.S. Cl. ......................... 422/177; 422/190; 422/211; 502/439
(58) Field of Search ........................... 502/439; 428/593, 428/603; 422/177, 190, 211

(56) References Cited

U.S. PATENT DOCUMENTS

| | | | |
|---|---|---|---|
| 5,079,210 | * | 1/1992 | Kaji et al. ............................... 502/439 |
| 5,116,581 | * | 5/1992 | Cyron et al. . | |
| 5,190,732 | * | 3/1993 | Maus et al. . | |
| 5,486,338 | * | 1/1996 | Ota et al. ............................... 422/179 |
| 5,494,881 | * | 2/1996 | Machida et al. ...................... 502/439 |
| 5,665,669 | * | 9/1997 | Yamanaka et al. ................... 502/527 |

FOREIGN PATENT DOCUMENTS

| | | | |
|---|---|---|---|
| 8266905 | * | 10/1996 | (JP) . |
| 96/34188 | * | 4/1996 | (WO) . |

OTHER PUBLICATIONS

International Search Report for PCT/SE97/00480.*

\* cited by examiner

*Primary Examiner*—Wayne Langel
*Assistant Examiner*—Christina Ildebrando
(74) *Attorney, Agent, or Firm*—Burns, Doane, Swecker & Mathis, LLP

(57) ABSTRACT

A catalytic converter reactor includes a substrate body and a very thin sheet metal mantle strip encircling the substrate body. The substrate body includes flat foil strips alternating with corrugated foil strips, the foil strips being wound-up to form axial flow through passages. The mantle strip has a thickness in the range of 0.1 to 0.8 mm, and is provided with radially inwardly projecting ridges received in radially outwardly open recesses of the substrate body, to axially lock the mantle strip to the substrate body.

15 Claims, 2 Drawing Sheets

CATALYTIC REACTORS

RELATED INVENTION

This application is a Continuation-in-Part of International Application Ser. No. PCT/SE97/00480, filed Mar. 21, 1997, which designated the United States.

BACKGROUND OF THE INVENTION

The present invention relates to improvements in catalytic reactors of a kind comprising a metal substrate body. Generally, such a substrate body consists of flat thin metal (foil) strips alternating with corrugated thin metal (foil) strips. The thickness of the flat and thin foil strips is typically in the range of 0.05 to 0.1 mm. The strips are wound upon themselves about an axis so as to form passages extending axially through the substrate body for through-flow and catalytic purification of exhaust gases.

To achieve the desired catalytic purification, a coating (so called washcoat) is applied on the foil strips, said coating usually consisting of an aluminum oxide and noble metals (such as e.g. rhodium, platinum, palladium).

The thus-wound substrate body is provided with an enclosing metal mantle. According to prior-art technology, this mantle has a sheet thickness of between 1 and 1.5 mm. The reason for the relatively large thickness of the mantle is to make it possible to fasten the mantle, by welding or brazing, to the substrate body and to a casing (canning) surrounding the mantle.

One problem encountered in a thus-structured catalytic reactor is its deficient strength. When hot gases (up to 1000° C.) flow through the passages, the foil strips are rapidly heated, and as a result the substrate body expands axially and radially. The surrounding mantle, on the other hand, is not directly exposed to the gas flow. Since in addition thereto the mantle is much thicker and thus has a larger mass to be heated than the foil strips, it will expand at a much lower rate. In consequence thereof, a considerable compression force will be generated in the space between the mantle and the outermost, thin layer of the substrate body. That is a potential cause of deformation of the outer corrugations in the substrate body with consequential destruction of the passages in that layer.

When the substrate body is cooling, the opposite problem arises. The foil strips are cooled at a much higher rate than is the considerably thicker mantle, the latter, as already mentioned, having no direct contact with the gas flow. Consequently, the substrate body will contract much quicker than the mantle. If, in this situation, the individual foil strips are joined together, considerable tension will be generated between the layers in the radial direction as a result of the differences in the extent of contraction between the substrate body and the mantle.

In substrate bodies wherein the coating is the only bonding agent, the strength of the bond will be exceeded and cracks and gaps form, usually in a couple of layers closest to the mantle. In substrate bodies having a diameter size of about 100 mm, a gap of 1 mm may form.

Considerable tension is generated in substrate bodies of the kind wherein the layers are joined together by brazing. Particularly the tension between the outermost layers of the substrate body and the mantle will be of such a magnitude that the brazed bonds run the risk of disrupting. The strength of the catalytic reactor is seriously affected by these problems.

The difference in expansion between the mantle and the substrate body is the principal reason for the generation of compression or tensile stress. The object of the invention is to provide a catalytic reactor having a mantle which is more adaptable to the motions of the substrate body and thus is able to prevent the substrate body from being exposed to harmful mechanical compression or tensile stress.

SUMMARY OF THE INVENTION

The thickness of the mantle is made much smaller than in the prior art, so that any compression stress that may be exerted on the foil strip corrugations or any tensile stress exerted on the brazed or welded bonds does not surpass the strength of the structure. The mantle suitably has a thickness not greater than 0.8 mm, more preferably not greater than 0.5 mm.

A second effect obtained by a mantle with highly reduced thickness in comparison with thicker prior art mantles in catalytic reactors of this type is a considerably reduced mass of the mantle. One consequence of the reduced mass is that the mantle will be heated and cooled much quicker than prior art mantles. Also, the temperature differences between the mantle and the substrate body will not be as great, and therefore the differences in rates of expansion and contraction between the mantle and the outermost layers of the substrate body will not be as great. This will lead to less compression and tensile stress. The reduced difference in contraction between the outermost layers of the substrate body and the mantle owing to the quicker cooling of the latter reduces or eliminates cracking and reduces the formation of gaps between these parts. The result is a catalytic reactor having considerably improved strength/durability.

As is evident from the above, the thin mantle produces two effects. The difference in expansion and contraction is reduced, and mantle-induced compression is lessened owing to the improved ductility. Both effects cooperate to increase the durability of the catalytic reactor.

BRIEF DESCRIPTION OF THE DRAWINGS

The thin mantle in accordance with the invention provides several other valuable advantages as will appear from the following detailed description with reference to the accompanying drawings, wherein.

DETAILED DESCRIPTION OF PREFERRED EMBODIMENTS OF THE INVENTION

Figure 1:
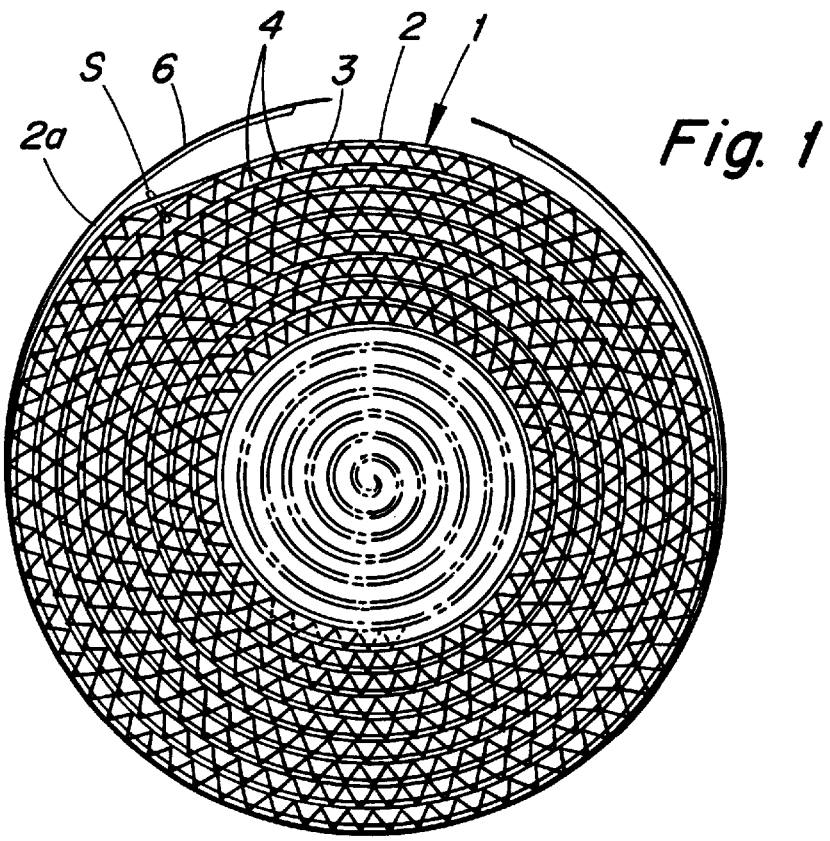
FIG. 1 is a cross-sectional view of a substrate body consisting of alternate flat and corrugated flat metal strips which are wound spirally upon themselves, according to the invention, and a body-enclosing mantle disposed in an open position.
Figure 2:
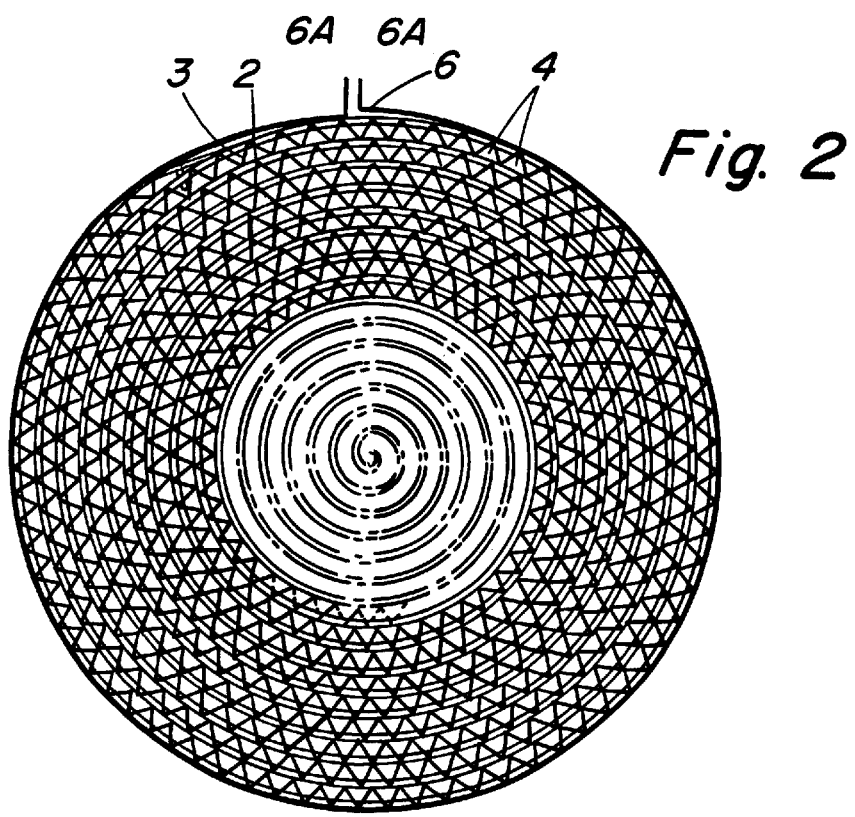
FIG. 2 is a view similar to FIG. 1 with the body-enclosing mantle in a closed position.

The substrate body 1 shown in FIG. 1 in a cross-sectional view includes alternate flat and corrugated metal (foil) strips 2 and 3 wound spirally to form a substrate body 1 having through-flow passages 4 extending therethrough. These foil strips 2, 3, prior to being wound, may first oxidized followed by the application of a catalytic coating (wash coating), which in itself is advantageous in order to ensure optimum reactor efficiency. However a drawback arises in that once the winding of the foil strips 2, 3 is completed, it becomes necessary, if the strips are to be joined together by welding or brazing (as is common in the prior art), to scrape off the coating on the outermost portion 2a of the flat foil strip 2 as well as on the neighboring portion of the corrugated foil strip 3. In addition, also the oxidized layer must be ground away.

As explained earlier herein, the prior art employs mantles 6 that have a thickness in the range of 1.0 to 1.5 mm, and after the mantle is applied around the substrate body 1 by compression molding, the prior art requires that the mantle be welded or brazed to the foil strip portions that have been exposed by the above-described scraping or grinding.

The disadvantages of this conventional method, employing welding or brazing, are on the one hand that it is comparatively complicated and time-consuming and on the other hand that the coating material, which is expensive, must be removed from the strips 2, 3.

In accordance with the present invention, a very thin mantle is used, i.e., the mantle 6 has a thickness T that is in the range 0.1 to 0.8 mm, more preferably 0.2 to 0.8 mm, and most preferably 0.2 to 0.5 mm. The mantle is used with foil strips 2, 3 having a thickness no greater than about 0.1 mm, usually in the range of 0.05 to 0.1 mm. Thus, for example, if the foil were 0.05, the ratio of mantle thickness to foil thickness would be 2 to 16 if the mantle thickness were 0.1 to 0.8 mm. The ratio would be 4 to 16 if the mantle thickness were 0.2 to 0.8 mm. The ratio would be 4 to 10 if the mantle thickness were 0.2 to 0.5.

By the use of a thin mantle in accordance with the present invention, the catalytic reactor assembly method may be simplified. After winding of the substrate body 1, on which a catalytic coating has been applied, the foil strips 2, 3 are stapled together at the end portion 2a by means of staples S, in order to prevent the foil strips 2, 3 from flexing apart. The substrate body 1 can now be removed from the machine in which the winding operation was performed, and the thin mantle 6 is applied about the substrate body 1 to an excellent fit, whereupon the ends 6A of the mantle 6 are welded together along a lengthwise joint.

As should be clearly apparent, this method is more convenient, quicker and consequently less expensive than conventional methods. In addition, it becomes possible to exploit other advantages offered by the thinner mantle 6, as will be described in the following.

Figure 3:
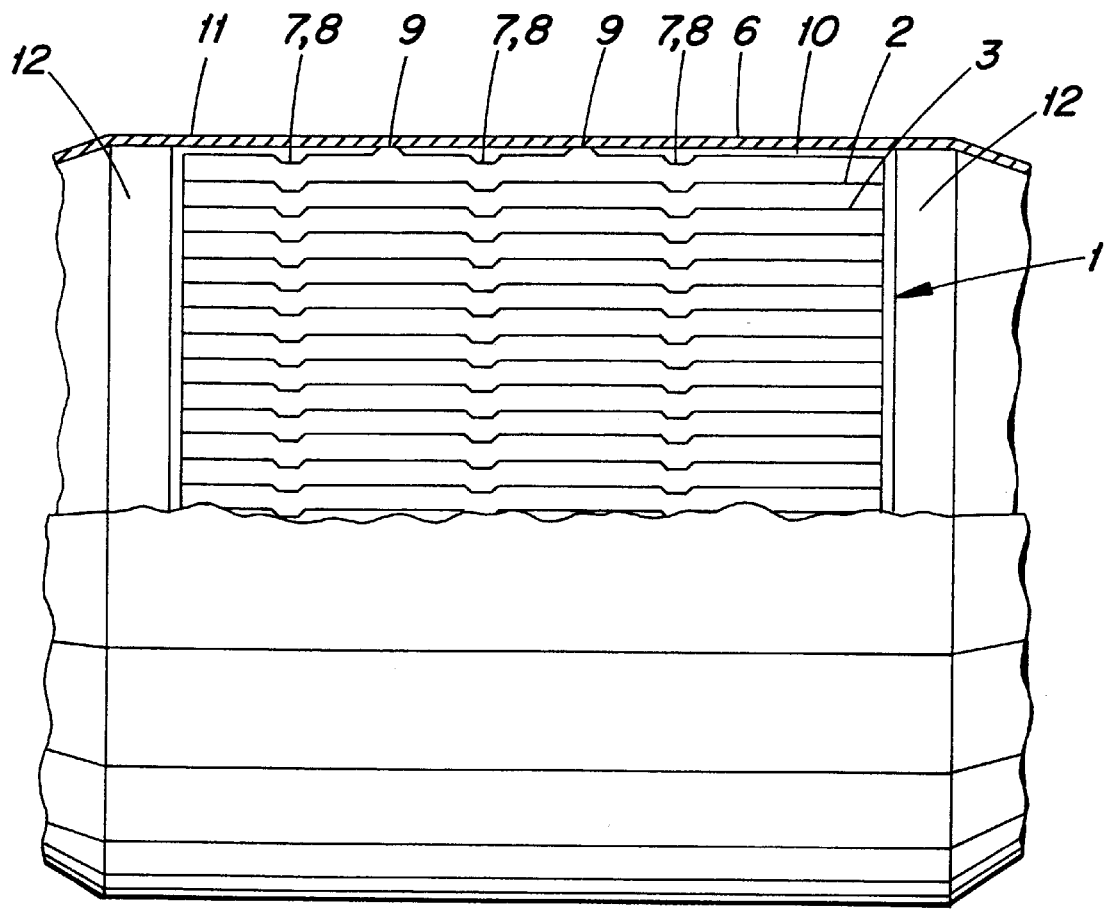
FIG. 3 is a view of the catalytic reactor as seen from the side, partly surrounded by a casing, i.e., a so called canning.
Figure 4:
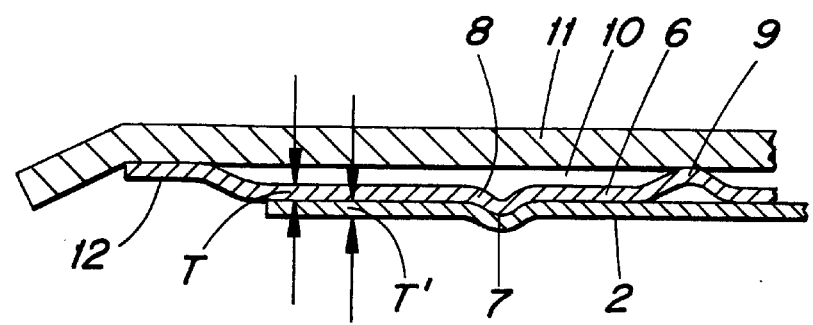
FIG. 4 is an enlargement of a fragment of FIG. 3.

When the substrate body 1 is made from alternate flat and corrugated foil strips 2, 3 in a manner wherein tabs formed in the corrugated strips 3 are used to keep the strips together by engagement of said tabs in channels formed in the flat strips 2 by rolling, the substrate body 1 will have the appearance illustrated in FIGS. 3 and 4, i.e., it exhibits radially outwardly open, peripheral impressions or grooves 7 on its circumferential surface. Because in this case the mantle 6 is thin (i.e., less than 0.8 mm), sharp-edged radially inwardly projecting ridges 8 are easily formed therein by deforming the mantle 6. The ridges fit into the grooves 7 formed in the circumferential surface of the substrate body 1. The connection between the grooves 7 and the ridges 8 fixes the mantle 6 axially relative to the substrate body 1, as required, and this connection thus is obtained without the need for the mantle 6 to be separately fastened to the substrate body, such as, e.g., by welding, brazing, riveting, or in any other way.

As also appears from FIGS. 3 and 4, the mantle 6 likewise exhibits some portions produced by rolling and which in a manner known per se form radially outwardly projecting annular protrusions 9 extending circumferentially around the mantle 6, preferably but not necessarily continuously. In prior art mantles, annular protrusions of that type have been provided, but they have only served to form a gap or clearance 10 between the mantle 6 and an outer casing 11 (canning) in the catalytic reactor in order to reduce heat transfer to the casing 11.

However, when these annular protrusions 9 are utilized in a thin mantle 6 according to the invention, there is imparted to the mantle 6 an appreciable amount of resiliency which serves to minimize any axial strain that may arise in the mantle. In that regard, each end of the mantle is normally welded to the canning. During operation, the mantle will be much warmer than the canning and will thus expand more. This difference in expansion rates produces axial strains in the weld points. The resiliency in the thin mantle of the present invention produced by the annular protrusions 9 significantly reduces those axial strains.

The corresponding protrusions 9 formed in a conventional, relatively thick mantle, in order to provide a radial spacing function, will not render the mantle sufficiently flexible to materially reduce the axial strain in the weld points, because the protrusions themselves are relatively thick. However, by providing them in a thin mantle, as described herein, sufficient resiliency is achieved to materially reduce such strain.

In order to minimize any radially directed forces to which the mantle 6 may be exposed and which may be caused by the rigidity of the casing 11, the mantle 6 suitably is equipped at each end face with a collar 12. The collar 12 facilitates the operation of welding the finished catalytic reactor to the casing 11. Prior to mounting, the collar may be given a slightly conical configuration, i.e., widening radially in the direction away from the substrate body 1, a configuration which ensures satisfactory abutment of the collar 12 against the inner face of the casing 11 as the reactor is being fitted into the latter, a feature which further facilitates the weld-ing operation.

The attachment of the catalytic reactor to the casing 11 via a collar 12 at both axial ends provides the additional advantage that vibrations and other movements, as well as slight deformations in the casing 11, are reduced or eliminated via said flexible collars 12 and therefore will not be propagated in full to the substrate body. Consequently, this arrangement contributes to increasing the strength/durability of the reactor.

As appears from the above description the thin-walled mantle 6 in accordance with the invention is instrumental in increasing the strength/durability of the catalytic reactor in several ways. A consequence of the flexible enclosure of the substrate body 1 produced by the mantle 6 is that the risk of deformation of the substrate body 1, resulting in the formation of cracks in the catalytic reactor material, is minimized and thus that the serviceable life of the catalytic reactor is increased.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A catalytic reactor comprising:
   a substrate body including a flat sheet metal foil strip and a corrugated sheet metal foil strip disposed one upon the other and wound-up spirally to form axial flow-through passages through the substrate body, the flat strip and the corrugated strip each having a thickness less than about 0.1 mm; and a sheet metal mantle strip encasing an outer circumferential surface of the substrate body and having a connection therewith, the mantle strip having a thickness no greater than 0.5 mm;

one of the mantle strip and the outer circumferential surface having impressions formed therein, and the other of the mantle strip and the outer circumferential surface having projections projecting into respective ones of the impressions to define the connection between the mantle strip and the substrate body and oppose relative axial movement between the substrate body and the mantle strip.

2. The catalytic reactor according to claim 1 wherein the mantle strip thickness is in the range of 0.1 to 0.5 mm.

3. The catalytic reactor according to claim 1, further including a metallic casing enclosing the mantle strip, the casing being welded to the mantle strip, wherein the mantle strip includes a radially outwardly projecting protrusion extending circumferentially for at least a portion of a circumference of the mantle strip for radially spacing the mantle strip from the casing and imparting resiliency to the mantle to minimize thermally-induced axial forces generated between the casing and the mantle strip during heating and cooling of the catalytic reactor.

4. The catalytic reactor according to claim 3, wherein the mantle strip includes two axial ends, each axial end including a collar, the catalytic converter further including a casing encompassing the mantle strip, the casing being welded to the collars.

5. The catalytic reactor according to claim 4, wherein the collars are of greater diameter than a portion of the mantle strip disposed therebetween.

6. The catalytic reactor according to claim 3, wherein the outer circumferential surface has radially outwardly open grooves defining the impressions, the mantle strip including radially inwardly projecting ridges defining the projections.

7. The catalytic reactor according to claim 6, wherein the mantle strip includes two axial ends, each axial end including a collar, the catalytic converter further including a casing encompassing the mantle strip, the casing being connected to the collars.

8. The catalytic reactor according to claim 7, wherein the collars are of greater diameter than a portion of the mantle strip disposed therebetween.

9. The catalytic reactor according to claim 1 wherein the flat strip is connected to the corrugated strip by projection/impression connections, one of the projection and the impression of each connection being formed in the flat strip, and the other of the projection and the impression being formed in the corrugated strip.

10. A catalytic reactor comprising:

a substrate body including a flat sheet metal foil strip and a corrugated sheet metal foil strip disposed one upon the other and wound-up spirally to form axial flow-through passages through the substrate body, the flat strip and the corrugated strip each having a thickness less than about 0.1 mm; and a sheet metal mantle strip encasing the substrate body, the mantle strip having a thickness no greater than 0.5 mm.;

the substrate body including an outer circumferential surface having radially outwardly open grooves, the mantle strip including radially inwardly projecting ridges disposed in respective grooves for opposing relative axial movement between the substrate body and the mantle strip.

11. The catalytic reactor according to claim 10, wherein the mantle includes two axial ends, each axial end including a collar, the catalytic converter further including a casing encompassing the mantle strip, the casing being connected to the collars.

12. The catalytic reactor according to claim 11, wherein the collars are of greater diameter than a portion of the mantle strip disposed therebetween.

13. The catalytic reactor according to claim 10 wherein the flat strip is connected to the corrugated strip by projection/impression connections, one of the projection and the impression of each connection being formed in the flat strip, and the other of the projection and the impression being formed in the corrugated strip.

14. A catalytic reactor comprising:

a substrate body including a flat sheet metal foil strip and a corrugated sheet metal foil strip disposed one upon the other and wound-up spirally to form axial flow-through passages through the substrate body, the flat strip and the corrugated strip each having a thickness less than about 0.1 mm; and a sheet metal mantle strip encasing an outer circumferential surface of the substrate body and having a connection therewith, the mantle strip having a thickness in the range of 0.1 to 0.8 mm, one of the mantle strip and the outer circumferential surface having impressions formed therein, and the other of the mantle strip and the outer circumferential surface having projections projecting into respective ones of the impressions to define the connection between the mantle strip and the substrate body and opposing relative axial movement between the substrate body and the mantle strip;

the flat strip being connected to the corrugated strip by projection/impression connections, one of the projection and the impression of each connection being formed in the flat strip, and the other of the projection and the impression being formed in the corrugated strip.

15. The catalytic reactor according to claim 14 wherein the thickness is in the range of 0.2 to 0.5 mm.

* * * * *